G. ESCHELLMANN & A. HARMUTH.
APPARATUS FOR MAKING SULFUR TRIOXID.
APPLICATION FILED JUNE 11, 1909.
937,148.
Patented Oct. 19, 1909.
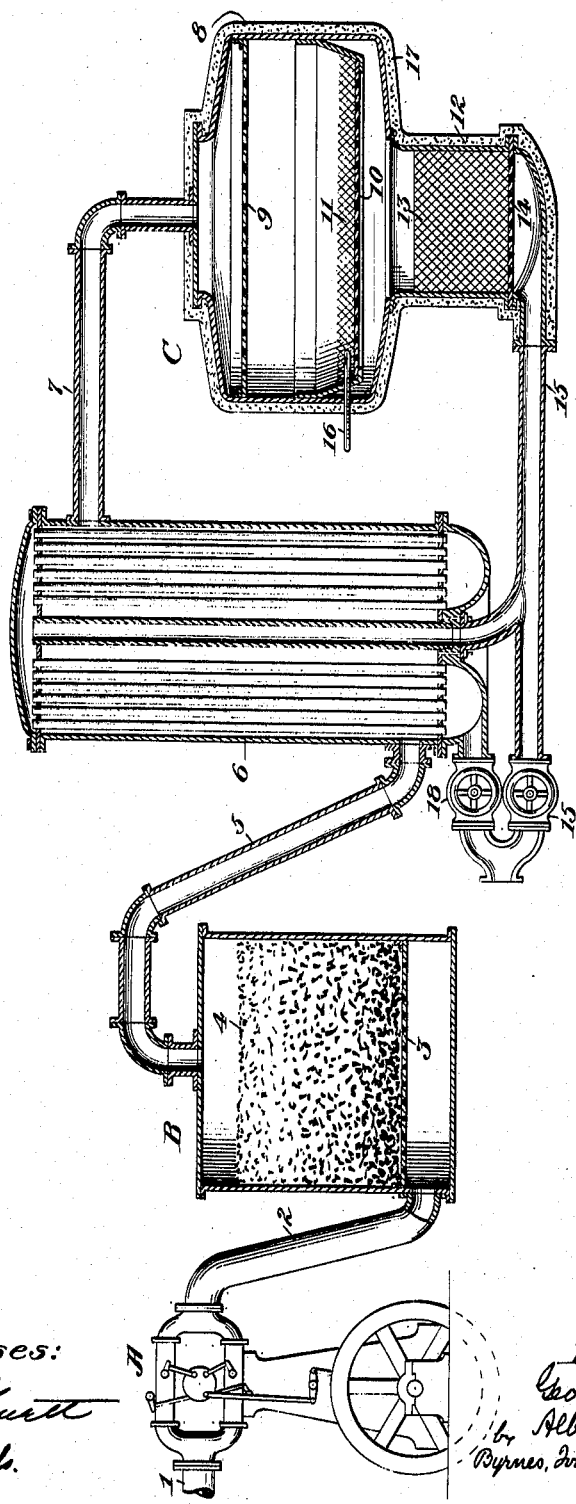
Witnesses:
Inventors:
Georg Eschellmann &
by Albert Harmuth
Byrnes, Townsend, & Brickenstein,
Att'ys.

UNITED STATES PATENT OFFICE.

GEORG ESCHELLMANN AND ALBERT HARMUTH, OF ST. PETERSBURG, RUSSIA, ASSIGNORS TO GENERAL CHEMICAL COMPANY, OF NEW YORK, N. Y., A CORPORATION OF NEW YORK.

APPARATUS FOR MAKING SULFUR TRIOXID.

937,148.  Specification of Letters Patent.  Patented Oct. 19, 1909.

Original application filed May 7, 1907, Serial No. 372,390. Divided and this application filed June 11, 1909. Serial No. 501,674.

*To all whom it may concern:*

Be it known that we, (1) GEORG ESCHELLMANN and (2) ALBERT HARMUTH, subjects of (1) the King of Great Britain, (2) the King of Prussia, German Emperor, residing at (1) and (2) St. Petersburg, Russian Empire, have invented certain new and useful Improvements in Apparatus for Making Sulfur Trioxid, of which the following is a specification.

In the manufacture of sulfur trioxid by the contact process, in which a mixture of sulfur dioxid and air is passed through one or more bodies of a catalytic agent, for example finely divided platinum, it is of the greatest importance that the platinum be maintained in a pure and active condition. It has heretofore been recognized that the presence of arsenic, even in minute quantities, in the charge-mixture injures the platinum and greatly decreases the efficiency of the process.

In practice, it is customary to force the mixture of sulfur dioxid, derived from the pyrites or sulfur burner, and air through the catalytic bodies by means of a mechanical pump, either a reciprocating blowing-engine or a rotary blower. We have discovered that this pump is a heretofore unsuspected source of contamination of the charge-mixture by reason of the oil which is employed for the lubrication of its moving parts. A small amount of the lubricating oil is taken up with the gases passing through the pump and carried with them into the contact chamber, where it is decomposed by the high temperature, carbon being precipitated upon the platinum or other catalytic agent. Carbon, like arsenic, greatly reduces the efficiency of the platinum and decreases the speed and completeness of the synthetic reaction.

According to the present invention, the gases leaving the pump are treated to remove substantially every trace of oil before they enter the contact chamber, preferably by the use of a coke filter.

A suitable apparatus is shown in the accompanying drawing, in which the figure is a side elevation of a connected blowing-engine, filter and contact chamber, the latter shown in axial section.

The blowing-engine A, here shown as of the ordinary vertical type with reciprocating piston, receives the mixture of sulfur dioxid and air through the pipe 1 and delivers it through the pipe 2 to the filter B. The filter is shown as a vertical cylindrical chamber, the gases passing into a space in the lower end beneath the horizontal perforated plate 3 which supports the filter-bed 4. This bed preferably consists of pieces of coke, decreasing in size from the lower to the upper end of the bed. Such a filter-bed is found to be an efficient means for removing traces of oil from the gas-mixture. From the filter a pipe 5 delivers the gases to the regulator 6 of a contact apparatus C, shown as of the type invented by Eschellmann and Harmuth and constituting the subject-matter of their U. S. Letters Patent 792,205, granted June 13, 1905. The gas-mixture enters the regulator at its lower end, passes upwardly around a number of tubes carrying hot sulfur trioxid and escapes at the top. A pipe 7 delivers the hot mixture into the top of the upper chamber 8 of the contact apparatus. This chamber has an upper perforated distributing plate 9 and a lower perforated plate 10 supporting a thin layer 11 of platinized asbestos. The lower chamber 12 of the contact apparatus contains another body 13 of platinized asbestos, supported on a perforated plate 14, and has a valved outlet pipe 15 for the products of reaction. A thermometer 16 is arranged to indicate the temperature in the catalytic layer 11, and the chambers are covered with heat insulation 17. The regulator 6 is arranged as a bypass from the pipe 15 and has a valved outlet 8. The valves in pipe 15 and this outlet may be set to shunt any desired portion of the gaseous products through the regulator, in order to maintain a uniform temperature in the catalytic body 11.

The herein-described process of making sulfur trioxid is claimed in our copending application, Ser. No. 372,390, filed May 7, 1907.

We claim:

1. In contact apparatus for making sulfur trioxid, comprising an oil-lubricated gas-pump and a contact-chamber, means for removing oil from the gases in transit from the pump to the contact-chamber.

2. In contact apparatus for making sulfur trioxid, comprising an oil-lubricated gas-pump and a contact-chamber, a filter for removing oil from the gases in transit from the pump to the contact-chamber.

In testimony whereof, we affix our signatures in presence of two witnesses.

GEORG ESCHELLMANN.
ALBERT HARMUTH.

Witnesses:
H. A. LOVIAGHIN,
E. FLEISHER.